United States Patent Office 3,169,073
Patented Feb. 9, 1965

3,169,073
HIGH SOLIDS PROTEIN-POLYMERIC DIALDEHYDE COATING COMPOSITIONS
Francis B. Weakley and Charles L. Mehltretter, Peoria, Ill., assignors to the United States of America as represented by the Secretary of Agriculture
No Drawing. Filed Nov. 16, 1961, Ser. No. 152,951
1 Claim. (Cl. 106—139)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to high solids protein-polymeric dialdehyde compositions and is a commercially advantageous improvement over the compositions disclosed in application Serial No. 69,237, filed November 14, 1960, of which this application is a continuation-in-part, and in which has been disclosed the preparation of novel paper coatings and sizing compositions comprising a low solids content of a novel casein-dialdehyde starch copolymer.

The said parent application relates to low (30–50%) solids content compositions in which the proportion of the constituent polymeric dialdehyde (substantially fully-oxidized dialdehyde starch) to casein is at least 10 percent and not more than 20 percent based on the dry weight of casein to achieve maximum insolubilization of the casein and high wet-rub resistance of the coating on paper.

Also in the application entitled "Polymeric Dialdehyde-Protein Adhesives and Wood Laminates Therewith" of Weakley and Mehltretter, Serial No. 152,950, filed November 16, 1961, there are disclosed self-curing wood glue compositions comprising the copolymer formed by reacting casein with only about 2½ percent of dialdehyde starch based on the dry weight of casein, but these wood glue compositions are too viscous to permit their being applied as paper coating and sizing agents by the high speed machines employed in the industry.

While such protein compositions may have academic value in paper manufacture, the paper industry is desirous of obtaining high solids compositions containing on the order of 65–70 percent solids but having sufficient fluidity for on-machine coating of paper and being capable of producing high wet-rub resistant coatings, so as to reduce the cost of drying the treated paper.

TAPPI monograph No. 11, "Preparation of Paper Coating Colors," (1953), page 32, teaches that high solids casein coating mixes of satisfactory fluidity may be made by addition of such alkaline flow modifiers as sodium hydroxide and sodium sesquisilicate. Strongly alkaline agents, however, cannot be used with dialdehyde starch-casein mixes because of undesirable degradation of dialdehyde starch under alkaline conditions and because of color formation. TAPPI monograph No. 11, page 35, also teaches that the addition of aldehyde donors to casein high solids coating mixes is impossible because undesirable viscosity increases occur due to rapid cross-linking of the protein that may cause gelation under the alkaline conditions of the reaction mixture.

It was completely unexpected, therefore, to find by the present invention that highly fluid paper sizing compositions containing 65–70 percent of total solids comprising casein, dialdehyde starch and clay pigment could be prepared by the appropriate addition of urea and that paper coated with such compositions and dried at 140–150° C. for several minutes had high wet-rub resistance and good wax pick values. We have also found that the addition of urea also serves to stabilize the viscosity of the coating mix so that it has a storage life of over 10 hours.

A principal object of this invention is the preparation of a stable casein-polymeric dialdehyde adhesive also containing finely divided mineral pigment which with the aid of added urea can be prepared in dispersions having solids concentrations of 65–70 percent with the necessary fluidity to allow on-machine application to paper. A further object is to produce smooth paper coatings with the above composition, having excellent wet-rub resistance and good wax pick properties. Although the use of urea as a dispersing agent for protein is well known in the art, its application to acidic high solids protein-polymeric dialdehyde copolymer compositions is not suggested. It has now been discovered that a smaller percentage of water will produce fluidity without highly thixotropic characteristics for a given high solids content if the protein-dialdehyde starch coating mixture also comprises urea. It is a further object of this invention to use paper coating compositions containing a much lower ratio of relatively expensive dialdehyde starch to casein than in copending application S.N. 69,237 so that as little as about 2 percent of dialdehyde starch based on the casein content can be used in combination with mineral pigment and urea to manufacture coated paper having high wet-rub resistance.

The basic ingredients of the coating composition of the present invention are casein, dialdehyde starch, water containing sufficient borax to disperse the said casein and the said dialdehyde starch, as well as enough urea to obtain fluidity of the mix with mineral pigment under acidic conditions; also minor amounts of conventional agents such as sodium hexametaphosphate and the like. It will be apparent to those familiar with the art that the proportions of the various ingredients will vary with the requirements of their use but total solids should be maintained between 65 and 70 percent.

Coating composition formulations embodying this invention are illustrated in the following examples.

EXAMPLE 1

*Preparation of dispersions*

(1) 12 gm. of casein (dry basis) was added to 22.5 ml. of water at 80° C. and stirred into a paste. 1.0 gm. of borax was then added and mixed well, followed by 4 gm. of urea and the whole heated at 75–80° C. for 30 minutes to disperse the casein. Water lost through heating was replaced.

(2) To 45 gm. of water was added 20 gm. urea and 0.2 gm. sodium hexametaphosphate which were dissolved by stirring. Next was added 100 gm. of clay pigment, and the whole was mixed well by stirring.

(3) 10.0 gm. of dialdehyde starch (dry basis) was added to 40 ml. of water at 60° C. One gm. of borax was added and the mixture agitated at 73° until dispersed (10–15 minutes), and then cooled and diluted to 50 ml.

Dispersions (1) and (2) were combined and 2.5 ml. of dialdehyde starch dispersion of step 3 representing 0.5 gm. dialdehyde starch was added and stirred well. This coating mixture (pH 5.9) had a solids concentration of 66 percent and an initial Brookfield viscosity at 20 r.p.m. of 36 poises at 25° C. not exceeding 49 poises in 24 hours with gradual stirring or agitation.

Paper coated with this composition had excellent wet-rub resistance and smoothness.

EXAMPLE 2

*Preparation of dispersions*

(1) 14 gm. of casein (dry basis) was added to 22.5 ml. of water at 80° C. and stirred into a paste. 1.2 gm. of borax was then added and mixed well, followed by 5 gm. of urea and the whole heated at 75–80° C. for 30 minutes to disperse the casein. Water lost through heating was replaced.

(2) To 45 ml. of water was added 23 gm. urea and 0.2 gm. sodium hexametaphosphate which was dissolved by stirring. Then was added 100 gm. of clay pigment and the whole was mixed well by stirring.

To combined dispersions (1) and (2) was added 2.9 ml. of dialdehyde starch dispersion (Example 1, dispersion (3)) and the mixture stirred well. This coating mixture (pH 6.0) had a solids concentration of 67 percent and underwent little change in viscosity (which was approximately 55 poises) in 18 hours.

Paper coated with this composition had excellent wet-rub resistance.

EXAMPLE 3

Example 1 was repeated using 34 ml. of water in dispersion (2). This coating mixture (pH 6.0) had a solids concentration of 70 percent. Its Brookfield viscosity of approximately 75 poises underwent little change in viscosity.

Paper coated with this composition had excellent wet-rub resistance.

EXAMPLE 4

*Preparation of dispersions*

(1) 12 gm. of casein (dry basis) was added to 22.5 ml. of water at 80° C. and stirred into a paste. 1.6 gm. of borax was then added and mixed well followed by 4 gm. of urea and the mixture heated at 75–80° C. for 30 minutes to disperse the casein. Water lost through heating was replaced. Dispersions (2) and (3) of Example 1 were also prepared, and the freshly prepared dispersion (2) was combined with casein paste (1). Then 1.25 ml. of freshly prepared dialdehyde starch dispersion (3) (containing 0.25 gm. dialdehyde starch) was added and stirred well. The coating mixture (pH 6.6) had a solids concentration of 67 percent. Paper coated with it had excellent wet-rub resistance.

Having disclosed our invention we claim:

A paper coating composition comprising 100 parts by weight of clay pigment, 12–14 parts by weight of casein, 0.25–1.0 part by weight of dialdehyde starch produced by essentially complete periodate oxidation of starch, 24–28 parts by weight of urea, 0.2 part of sodium hexametaphosphate, and water, said composition prior to application to paper having a total solids content of 65 to 70 percent and a Brookfield viscosity of about 29 to 80 poises at 25° C.

References Cited by the Examiner

UNITED STATES PATENTS

| | | | |
|---|---|---|---|
| 2,482,879 | 9/49 | Schmutzler et al. | 106—24 |
| 2,537,114 | 1/51 | Young et al. | 260—8 |
| 2,606,118 | 8/52 | Yelland | 260—233.3 |

LEON J. BERCOVITZ, *Primary Examiner.*

A. D. SULLIVAN, *Examiner.*